United States Patent [19]

Abramson et al.

[11] Patent Number: 4,573,348

[45] Date of Patent: Mar. 4, 1986

[54] ANGULAR POSITIONING ACTUATOR

[75] Inventors: Robert D. Abramson, Livonia; David A. Donovan, Chelsea; Nathaniel L. Field, Northville, all of Mich.

[73] Assignee: Ford Motor Company, Dearborn, Mich.

[21] Appl. No.: 610,217

[22] Filed: May 14, 1984

[51] Int. Cl.⁴ ............................................. G01M 15/00
[52] U.S. Cl. .......................................... 73/118; 91/392
[58] Field of Search ................. 73/118; 91/1, 59, 166, 91/392

[56] References Cited

U.S. PATENT DOCUMENTS 3,434,387  3/1969  Ellis ............................................ 91/1
3,720,138  3/1973  Van Scog ................................... 91/1

Primary Examiner—Jerry W. Myracle
Attorney, Agent, or Firm—Frank G. McKenzie; Donald J. Harrington

[57] ABSTRACT

A shift lever and throttle lever coaxially mounted on the casing of an automatic transmission are engaged, respectively, by a lever mounted on each of two concentric shafts whose axes are aligned with the axis of the transmission levers. The shafts have torque sensors located between the levers carried by the shafts and bearings that support the shafts in rotation. The outer shaft has a radial positioning actuator which is hydraulically driven from a source of hydraulic pressure through a servo controlled valve that selectively opens and closes hydraulic passages. The actuator includes a vane fixed to the shaft and a stator that divides a cavity into two halves, each of which is pressurized selectively by operation of the servo. The angular position of the shaft from a reference position is produced by a variable impedance transducer whose sensor is held at a fixed distance from the axis of the shaft and which produces an output voltage that is proportional to the distance between the face of the sensor and a cam surface, whose distance from the axis of the shaft varies linearly with its rotation from a reference position.

7 Claims, 9 Drawing Figures

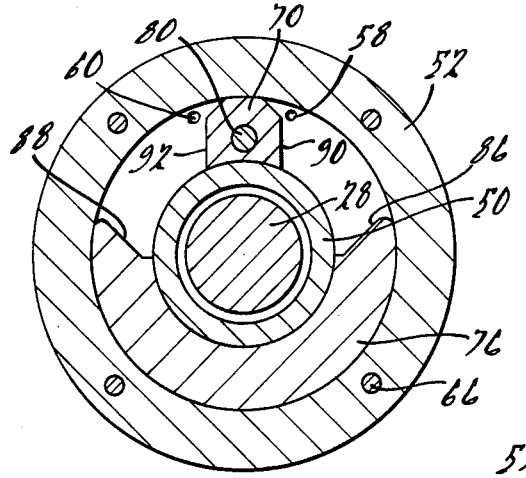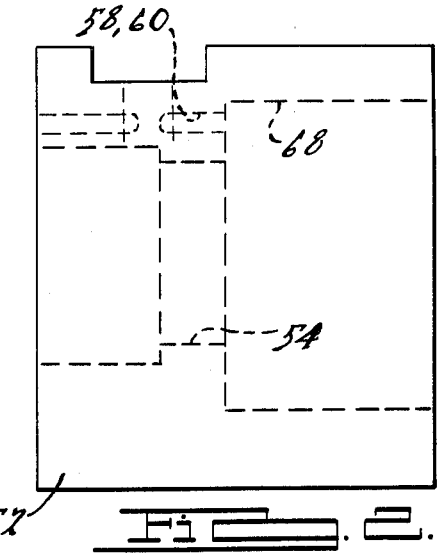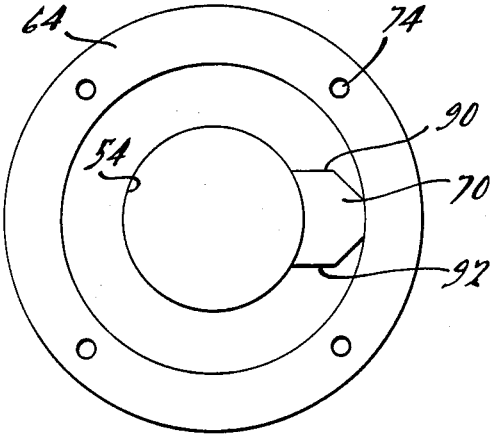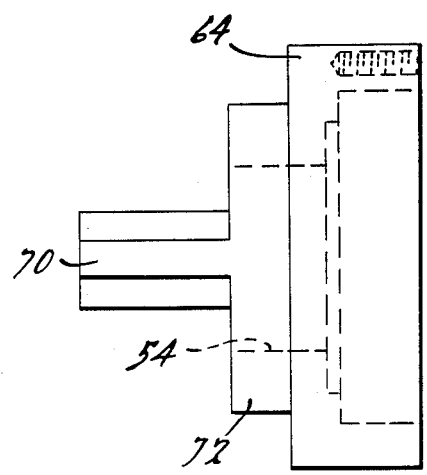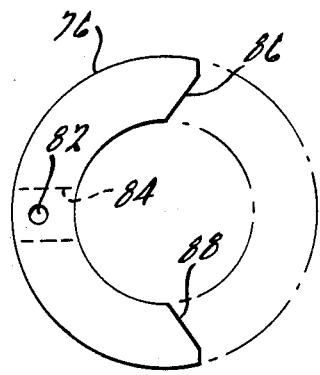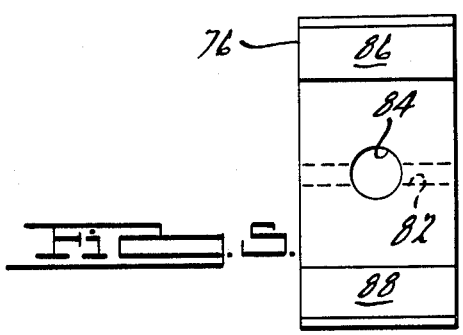

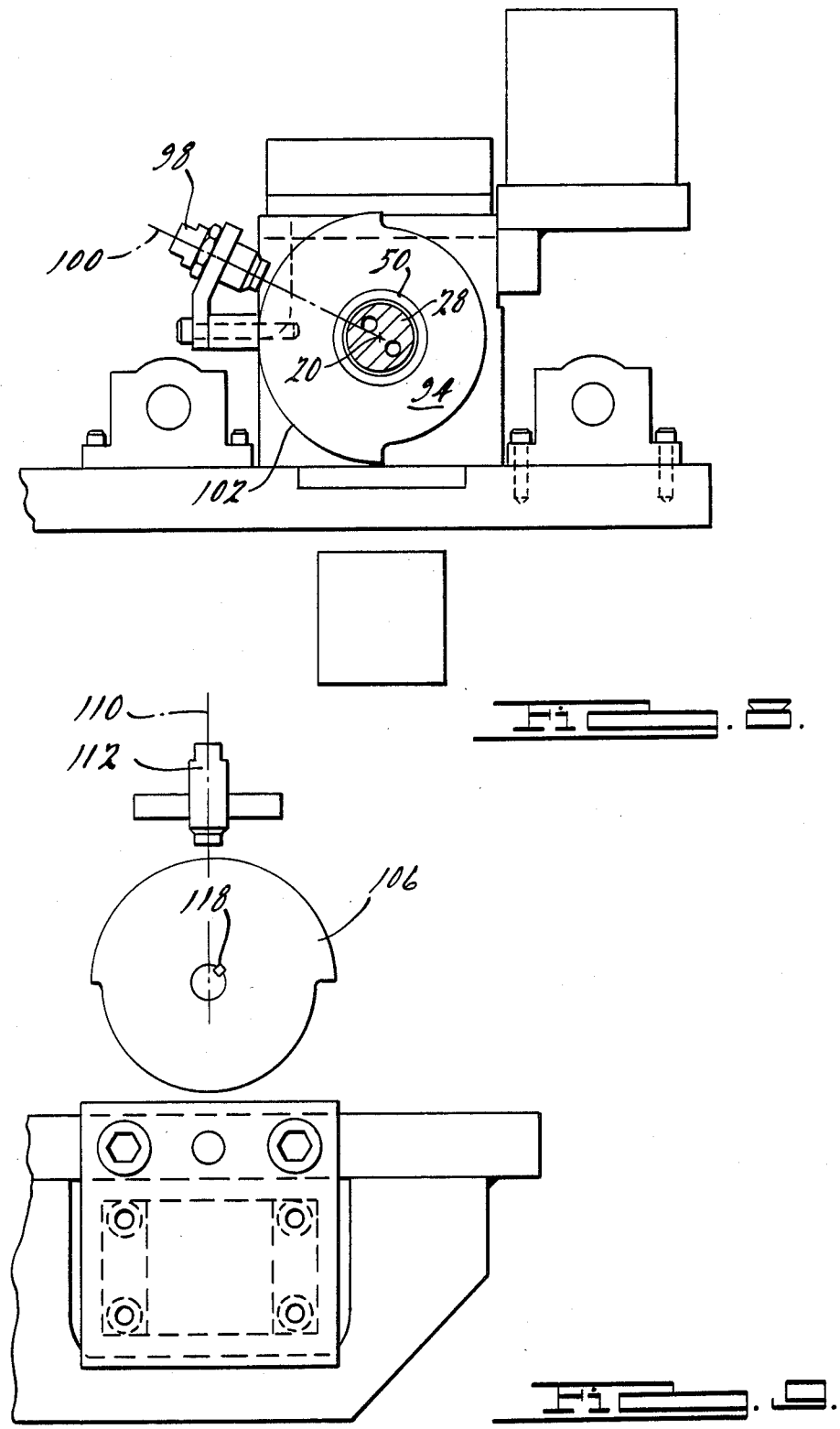

ANGULAR POSITIONING ACTUATOR

BACKGROUND OF THE INVENTION

1. Field of the Invention

This invention relates generally to the field of torque sensors and angular position sensors and more particularly pertains to the use of such sensors in the testing of automotive automatic transmissions.

2. Description of the Prior Art

After an automotive automatic transmission is assembled, the throttle valve mechanism and the gear selector mechanism of the transmission are tested to assure that the angular positions of the respective control levers correspond to the desired transmission function and that the torque required to move the levers between the various positions is within an acceptable range of tolerance. In conventional test systems for controlling movement of the transmission mechanism, rack and pinion gears are used to transmit power to the shift lever and gear selecting lever. Torque transmitted through the rack and pinion system is measured and the angular positions of the levers are determined from the angular position of the pinion with respect to a reference position. This drive system has inherent capacity to produce inaccurate results because backlash necessarily present in the rack and pinion system adversely affects the measurement of angular position. Consequently, the angular position of the control levers and the torque required to move them cannot be determined with acceptable precision. Furthermore, because the support for the various shafts driven by the rack and pinion system require an unacceptably large amount of friction, the measured torque is more than the torque required to move the gear selector mechanism and throttle mechanism.

SUMMARY OF THE INVENTION

The angular positioning actuator, according to the present invention, transmits power to two coaxial shafts that are connected by levers to the shift selector mechanism and throttle mechanism of the transmission. The shafts are supported on low friction bearing surfaces. Torque sensing devices measure the magnitude of torque in the shafts between the attachment of the shaft to the transmission mechanisms and the bearing support surfaces. In this way an accurate measurement of the torque required to rotate the transmission mechanisms is recorded.

A source of pressurized hydraulic fluid is connected to a first radial positioning actuator through a servo control valve that selectively pressurizes and depressurizes spaces within the actuator that are separated by a stator element. A vane, mounted on the shaft that is turned by the actuator, is located within the chamber defined by the actuator. The pressure within the various chambers is modulated so that the vane is turned in accordance with the connections made by the servo valve between the fluid pressure source and the chambers of the radial positioning actuator. In this way the shaft is turned incrementally in accordance with an electrical signal supplied by an electronic logic circuit or device, such as a microprocessor, which controls operation of the servo valve.

The position of the shaft with respect to a reference position is measured by a variable impedance sensor having an electrical coil that induces eddy currents in the surface of a cam mounted concentrically with the shaft. The cam defines a cam surface whose position with respect to the shaft axis varies radially and linearly with the angular position of the shaft with respect to a reference position. The magnitude of an output voltage produced by this sensor is, therefore, a measure of the angular position of the shaft with respect to the reference position.

BRIEF DESCRIPTION OF THE DRAWINGS

FIG. 2 is a side view of the housing of a rotary actuator.

FIG. 3 is an end view of the cap that seals the housing of the rotary actuator.

FIG. 4 is a side view of the cap shown in FIG. 3.

FIG. 5 is a side view of the vane for the rotary positioning actuator.

FIG. 6 is an end view of the vane shown in FIG. 5.

FIG. 7 is a cross section through the angular positioning actuator taken at plane VII—VII of FIG. 1.

FIG. 8 is a cross section taken at plane VIII—VIII of FIG. 1 showing the angular position sensor.

FIG. 9 is a cross section taken at plane IX—IX of FIG. 1.

DESCRIPTION OF THE PREFERRED EMBODIMENT

Figure 1:
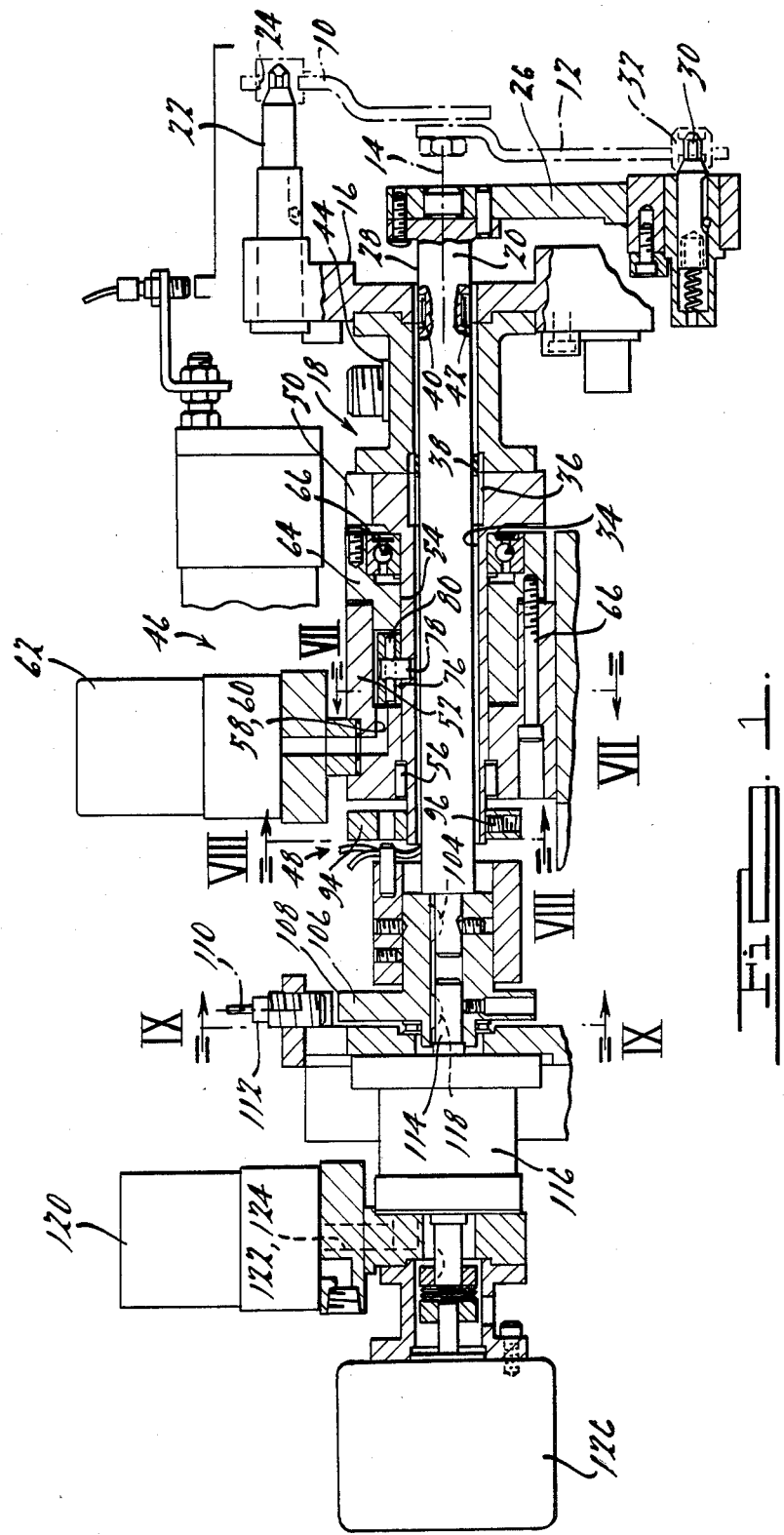
FIG. 1 is a cross section through the axis of an angular positioning actuator according to this invention.

Referring first to FIG. 1, shift lever 10 and throttle valve lever 12 extends radially outward from a common pivot axis 14 on the casing of an automatic transmission. In the vehicle these levers are connected to the shift selector within the passenger compartment and the carburetor within the engine compartment, respectively.

A first lever 16, mechanically attached to a first shaft assembly 18, extends radially outward from the axis 20 of shaft 18 and carries an axially retractable pin 22 that can be fitted within a bushed hole 24 on lever 10 eccentric of axis 14. Similarly, a second lever 26, attached to a second shaft 28, extends radially outward from axis 20 and carries an axially retractable pin 30 that engages a bushed hole 32 on the lever 12 eccentric of axis 14.

The first and second shafts 18, 28 are coaxial along a major portion of their lengths, shaft 28 being located within the space defined by bore 34 of the first shaft assembly. Located within the annular space between bushing 36 and the outer surface of shaft 28 is a Teflon ring 38 that supports shaft 28 in rotation about axis 20.

Shaft 28 is formed with a shallow recess 40 on its outer cylindrical surface in which strain gauges 42 are bonded. The strain gauges are electrically connected to form the conventional wheatstone bridge circuit that produces an electrical signal representing the magnitude of the torque carried by shaft 28 between ring 38 and lever 26. Similarly, the torque carried by shaft assembly 18 between lever 16 and ring 38 is measured by a torque meter 44, such as the reaction torque meter produced by S. Himmelstein Company, which also produces an electrical signal representing the magnitude of torque transmitted.

A rotary actuator 46 is located in the torque path between torque meter 44 and rotary position sensor 48. The rotary actuator includes a sleeve shaft 50, mechanically connected to torque meter 44, and provides a continuation of bore 34 into which shaft 28 is received. A housing 52 defines a bore 54 into which shafts 18, 28 are inserted and provides an annular recess in which needle bearing 56 is fitted for supporting shaft 28 in rotation. Housing 52 has first and second fluid passages 58, 60 that carry hydraulic fluid through a servo valve 62, which is continuously connected to a source of pressurized fluid, such as the outlet side of a hydraulic pump. The operation of servo 62 is controlled by a microprocessor or other electronic logic means for selectively opening and closing communication between the fluid source and passages 58, 60 in accordance with the direction and angular displacement of shaft 18 that is desired. A cap 64 is connected mechanically by axially directed bolts 66 to the housing, which has a bore coaxial with bore 54 that permits the first and second shafts to be inserted therein. Cap 64 also provides a recess for a ball bearing 66 that supports shaft assembly 18 in rotation.

Referring now to FIG. 2, housing 52 defines a cavity 68, which communicates through servo 62 with the fluid pressure source, and through passages 58, 60, which are spaced angularly about the axis of the housing.

FIGS. 3 and 4 show that the cap 64 provides a continuation of bore 54, which receives shafts 18, 28 and defines a stator element 70 that extends axially outward from a shoulder 72 on the body portion of the cap. Angularly spaced, tapped and threaded holes 74 are aligned with tension bolts 66 that are fitted into the end of the housing. When the bolts are drawn up on the threads, cavity 68 is hydraulically sealed at its axial end by the cap member. On assembly the cap is inserted within the housing so that stator 70 is located angularly about the axis of the housing and separates cavity 68 into a first portion that is supplied with hydraulic fluid through passage 58 and a second portion that is supplied with hydraulic fluid through passage 60.

FIGS. 5 and 6 illustrate a vane 76 that is fitted over the outer surface of sleeve shaft 50 and fixed thereto by inserting a drill rod 78 radially through the vane and into the wall thickness of shaft 50. A roll pin 80, inserted through an axial hole in rod 78 and aligned with a corresponding hole in the vane, mechanically connects the vane to the rod. The vane is formed with first and second surfaces 86, 88 that are adapted to contact lateral surfaces 90, 92, respectively, on stator 70.

Operation of the radial positioning actuator can be illustrated best with reference to FIG. 7. When servo 62 opens passage 60 to tank and connects passage 58 to the source of fluid pressure, vane 76, sleeve shaft 50 and other portions of shaft assembly 18 rotate clockwise when viewed as shown in FIG. 7. When servo 62 opens passage 58 to tank and connects passage 60 to the fluid pressure source, vane 76 and shaft assembly 18 rotate counterclockwise. FIG. 7 shows vane 76 in an intermediate position between the extremities of its angular travel, which are established by contact of its surface 86 on surface 90 of stator 70 and, at the opposite extreme, contact between surfaces 88 and 92. Servo 62 can be modulated by operation of its control so that pasages 58 and 60 are connected and disconnected to the fluid pressure source at high frequency so that the angular position of vane 76 and of shaft assembly 18 are controlled within a close angular tolerance.

The angular position sensor 48 includes a cam 94 whose position on shaft 50 is fixed by a set screw 96. FIG. 8 shows the arrangement of the cam mounted on the shaft and the relative position of shaft 28, which extends through the cam and shaft 50. The angular position sensor includes a variable impedance transducer having a sensor 98 that includes a coil supplied with an electrical current. As shaft 50 and cam 94 rotate about axis 20 in response to the modulated pressure in the cavity of radial actuator 48, eddy currents are induced in the cam; the magnitude of the current changes due to variations in the distance between the surfaces of the cam and of the sensor. The eddy currents are used to produce an electrical signal, a variable voltage, that represents the angular displacement of the shaft and cam from a reference position 100, the axis of sensor 98. The cam is formed with a surface 102 whose distance from axis 20 varies radially and linearly as the angular position of the cam changes from the reference position. The output signal produced by the sensor is a voltage proportional to the distance between the face of sensor 98 and cam surface 102.

The angular position sensing means may include the displacement measuring system Multi-Vit Model No. KD-2300-2S produced by Kamam Sciences Corporation, Colorado Springs, Colo. The servo valves may be full control servo valves, Model 207, produced by Atchley Controls, Inc., Canoga Park, Calif.

Shaft 28 is connected by Woodruff Key 104 located in a key way on the shaft to a second cam 106 formed with a cam surface similar to that of cam 94. The distance between cam surface 108 and axis 20 varies radially and linearly with the angular displacement of shaft 28 from a reference position, axis 110. The reference position is the axis of the sensor 112 of a variable impedance transducer such as those produced by Kaman Sciences Corporation, Colorado Springs, Colo. The output from the sensor is a voltage whose magnitude varies with the distance surface 108 is from the surface of sensor 112. The signal produced by the displacement measuring system is a signal that represents the angular displacement of shaft 28 about axis 20.

Cam 106 is connected by Woodruff key 118 to shaft 114 of a rotary actuator 116, such as a Tork-Mor Rotary Actuator Model No. DS-15-1 produced by Roto Actuator Corporation, St. Clair Shores, Mich. Servo 120, of the type previously described, connects the fluid pressure source to hydraulic passages 122, 124 that supply the rotary actuator 116. Actuator 116 includes bearings that support shaft 28 in rotation.

The signal produced by radial position sensor 112 can be verified by driveably connecting shaft 118 to an angular displacement transducer 126, which produces an electrical signal representing the angular displacement of shaft 128 from its reference position. Encoder 126 may be an angular displacement transducer such as Model No. 600 produced by Trans-tek Incorporated, Ellington, Conn.

Having described a preferred embodiment of our invention, we claim and desire to secure by U.S. Letters Patents is:

1. A device for actuating the shift mechanism and throttle mechanism of an automatic transmission comprising:
   a first and second shafts having a common axis along at least a portion of their lengths mounted for rotation about their axes, the second shaft being fitted within the first shaft;
   first and second levers carried by and extending outwardly from the axes of the first and second shafts, respectively, for connecting the shafts to the shift mechanism and throttle mechanism, respectively;
   a source of pressurized fluid;

first means communicating with the fluid source and driveably connected to the first shaft for rotating said shaft about its axis;

first angular position sensing means driveably connected to the first shaft for producing a signal representative of the angular displacement of the first lever from a first reference position;

second means communicating with the fluid source and driveably connected to the second shaft for rotating said shaft about its axis; and second angular position sensing means driveably connected to the first shaft for producing a signal representative of the angular displacement of the second lever from a second reference position.

2. The device of claim 1 further including:

first torque sensing means located in the power transmission path between the first lever and the support for the first shaft that is nearest the first lever, for measuring the torque transmitted by the first shaft between the first lever and the first rotating means.

3. The device of claim 2 wherein the second angular position sensing means includes:

a second cam driveably fixed to the second shaft defining a surface whose distance from the axis of said shaft varies linearly with the angular displacement of said shaft from a second reference position; and a second sensor mounted at a predetermined distance from the axis of the second shaft adjacent the defined surface of the second cam having a coil supplied with electrical current, whereby eddy currents induced in the second cam cause a variable impedance in the coil due to variations in the distance between the second sensor and the defined cam surface and produce a signal representative of the angular displacement of the second shaft from the second reference position.

4. The device of claim 1 wherein the first angular position sensing means includes:

a first cam driveably fixed to the first shaft defining a surface whose distance from the axis of said shaft varies linearly with the angular displacement of said shaft from a first reference position; and a first sensor mounted at a predetermined distance from the axis of the first shaft adjacent the defined surface of the first cam, having a coil supplied with electrical current, whereby eddy currents induced in the first cam cause a variable impedance in the coil due to variations in the distance between the first sensor and the defined cam surface and produce a signal representative of the angular displacement of the first shaft from the first reference position.

5. The device of claim 1 wherein the first rotating means includes:

valve means connected to the fluid source having first and second outlet passages for selectively connecting the outlet passages to the fluid source in accordance with the desired radial position of the first shaft relative to the first reference position;

a housing adapted to receive the first and second shafts therein, defining a fluid-tight cavity between the outer surface of the first shaft and the inner surface of the housing, communicating with the outlet passages of the first valve means;

a vane fixed to the first shaft and located within the cavity of the housing, having first and second surfaces located eccentric of the axis of the first shaft on which surfaces pressure forces are developed as the cavity is pressurized; and a stator located within the cavity of the housing and fixed against rotation, defining with the first vane surface a first space, and defining with the second vane surface a second space, each space being selectively connected and disconnected to the fluid pressure source through either the first or second outlet passages;

whereby the first shaft is rotated about its axis due to the pressure force acting on the surfaces of the vane as the first and second spaces are pressurized from the fluid source.

6. A device for actuating the shift mechanism of an automatic transmission a first shaft;

a first lever carried by and extending outwardly from the axis of the first shaft for connecting the shaft to the shift mechanism;

a source of pressurized fluid;

first rotating valve means connected to the fluid source having first and second outlet passages for selectively connecting the outlet passages to the fluid source in accordance with the desired radial position of the first shaft relative to a first reference position;

a housing adapted to receive the first shaft therein, defining a fluid-tight cavity between the outer surface of the first shaft and the inner surface of the housing, communicating with the outlet passages of the first valve means;

a vane fixed to the first shaft and located within the cavity of the housing, having first and second surfaces located eccentric of the axis of the first shaft on which surfaces pressure forces are developed as the cavity is pressurized;

a stator located within the cavity of the housing and fixed against rotation, defining with the first vane surface a first space, and defining with the second vane surface a second space, each space being selectively connected and disconnected to the fluid pressure source through either the first or second outlet passages;

whereby the first shaft is rotated about its axis due to the pressure force acting on the surfaces of the vane as the first and second spaces are pressurized from the fluid source;

a cam driveably fixed to the first shaft defining a surface whose distance from the axis of the first shaft varies linearly with the angular displacement of the first shaft from the reference position; and a sensor mounted at a predetermined distance from the axis of the first shaft adjacent the defined surface of the first cam, having a coil supplied with electrical current, whereby eddy currents induced in the cam cause a variable impedance in the coil due to variations in the distance between the sensor and the defined cam surface and produce a signal representative of the angular displacement of the first shaft from the first reference position.

7. A device for actuating the throttle mechanism of an automatic transmission comprising:

a shaft;

a lever carried by and extending outwardly from the axis of the shaft for connecting the shaft to the throttle mechanism;

a source of pressurized fluid;

first rotating valve means connected to the fluid source having first and second outlet passages for selectively connecting the outlet passages to the fluid source in accordance with the desired radial position of the shaft relative to a reference position;

a housing adapted to receive the first shaft therein, defining a fluid-tight cavity between the outer surface of the shaft and the inner surface of the housing, communicating with the outlet passages of the first valve means;

a vane fixed to the first shaft and located within the cavity of the housing, having first and second surfaces located eccentric of the axis of the first shaft on which surfaces pressure forces are developed as the cavity is pressurized;

a stator located within the cavity of the housing and fixed against rotation, defining with the first vane surface a first space, and defining with the second vane surface a second space, each space being selectively connected and disconnected to the fluid pressure source through either the first or second outlet passages;

whereby the shaft is rotated about its axis due to the pressure force acting on the surfaces of the vane as the first and second spaces are pressurized from the fluid source;

a cam driveably fixed to the shaft defining a surface whose distance from the axis of the shaft varies linearly with the angular displacement of the shaft from the reference position; and a sensor mounted at a predetermined distance from the axis of the shaft adjacent the defined surface of the cam, having a coil supplied with electrical current, whereby eddy currents induced in the cam cause a variable impedance in the coil due to variations in the distance between the sensor and the defined cam surface and produce a signal representative of the angular displacement of the shaft from the reference position.

* * * * *